United States Patent
Kim

(10) Patent No.: US 6,546,689 B1
(45) Date of Patent: Apr. 15, 2003

(54) CONSTRUCTION AND METHOD FOR JOINTING A PLURALITY OF STEEL MEMBERS USING SHEAR RINGS

(75) Inventor: Nam Young Kim, Seoul (KR)

(73) Assignee: Ssedaa Technology Co., Ltd., Seoul (KR)

( * ) Notice: Subject to any disclaimer, the term of this patent is extended or adjusted under 35 U.S.C. 154(b) by 0 days.

(21) Appl. No.: 09/857,978

(22) PCT Filed: Dec. 27, 1999

(86) PCT No.: PCT/KR99/00819

§ 371 (c)(1),
(2), (4) Date: Jun. 11, 2001

(87) PCT Pub. No.: WO00/39416

PCT Pub. Date: Jul. 6, 2000

(30) Foreign Application Priority Data

Dec. 26, 1998 (KR) .............................. 98-58697
Dec. 21, 1999 (KR) .............................. 99-60063

(51) Int. Cl.[7] .................................. E04B 1/38
(52) U.S. Cl. ...................... 52/698; 52/655.1; 52/656.9; 52/741.1; 403/408.1; 403/338
(58) Field of Search ............ 52/655.1, 656.9, 52/741.1, 698; 403/408.1, 256, 260, 338, 388

(56) References Cited

U.S. PATENT DOCUMENTS 2,284,214 A * 5/1942 Kelly ...................... 403/408.1
2,400,864 A * 5/1946 Alcott ........................ 403/280
2,444,276 A * 6/1948 Aldrich ...................... 403/388
3,531,850 A * 10/1970 Durand ......................... 29/432
3,828,515 A * 8/1974 Galgoczy et al. ............. 29/432
6,367,224 B1 * 4/2002 Leek ........................... 403/187

FOREIGN PATENT DOCUMENTS

AU  127794 * 2/1948 ................. 403/388
FR  895472 * 1/1945 ................. 403/388
SU  621904 * 8/1978 ................. 403/388

* cited by examiner

Primary Examiner—Carl D. Friedman
Assistant Examiner—Brian E. Glessner
(74) Attorney, Agent, or Firm—Notaro & Michalos P.C.

(57) ABSTRACT

Disclosed is a construction and method for jointing steel members using shear rings, achieving a jointing construction to which a real shearing force can be applied, improving working conditions, the jointing strength and durability, and reducing material. The construction has at least one first steel member and at least one second steel member overlapped together and respectively having at least a bolt hole and at least an annular groove, and at least one shear ring inserted in the annular groove of both the first steel member and the second steel member to prevent slip between the first steel member and the second steel member. The annular groove is formed at each of contact surfaces of the first steel member and the second steel member, and the bolt hole has a first clearance while the annular groove of at least one of the first steel member and the second steel member has a second clearance smaller than the first clearance. The second clearance allows a deformation or a displacement of the first steel member and the second steel member against an assembling force by the bolt and the nut until the bolt comes in contact with a side wall of the bolt hole.

6 Claims, 9 Drawing Sheets

CONSTRUCTION AND METHOD FOR JOINTING A PLURALITY OF STEEL MEMBERS USING SHEAR RINGS

BACKGROUND OF THE INVENTION

1. Field of the Invention

The present invention relates to a construction and method for jointing steel members using shear rings, and more particularly to a construction and method for jointing steel members using shear rings, achieving a jointing construction to which a real shearing force can be applied in jointing the steel base member and the steel overlapping plate by using bolts and shear rings in constructing a steel structure such as a building, a bridge and machinery, thereby improving working conditions, reducing material, and improving the jointing strength and durability.

2. Prior Arts

In general, various constructions for assembling or jointing steel plates or steel members are used in fields of not only architecture and civil engineering works for bridges, high-story buildings, etc., but also shipbuilding, aircraft industry and general machinery industry, and the constructions in these fields use various methods including welding, bolt-assembling, etc., for assembling or attaching steel plates or steel beams (hereinafter, steel members).

Welding is not common due to its difficulty in working and problem of corrosion. Instead, so-called friction jointing method depending on axial force of bolts is commonly utilized nowadays.

However, in case of the friction jointing method depending on axial forces, after the steel members are jointed or assembled, the initial state can be maintained only in a range of along-time axial force of the bolt or a simple shearing strength of the bolt.

Therefore, since load of the steel member up to hundreds of tons should be held by the frictional force by the axial forces of the bolts, a large number of bolts are used in assembling or jointing the steel members, which requires great human labor and appliance, although it is not easy to achieve even the required jointing force and moreover the working is prolonged.

To solve the above problems, proposed have been some inventions, in which a plurality of reinforcing piece are inserted in the jointing surface to be attracted into the base member when the bolt and the nut are assembled together, or in which the jointing surface is formed uneven (friction-jointing method), so as to increase the frictional force. However, there remains a problem of still requiring a large number of bolts and nuts since it is difficult to obtain more than one and half times of jointing force in average only by the increase of the frictional force. Further, the large number of bolts decreases the effective sectional area, which successively decreases the jointing strength and increases the number of working steps. Especially when the bolts are released by dynamic load for long time, there is no solution.

When the reinforcing pieces are located between the jointing surfaces and attached by an adhesive, they are released again during assembling. Further, it is difficult to get a jointing force capable of forcing the reinforcing pieces by bolts, which means it is impossible to employ this method.

In Korean Patent Application No. 98-23239, which was invented by the inventor of the present invention to overcome the above problems, object 1 and 2 to be jointed are jointed by bolts 3, nuts 7 and washers 8 through joint hole 3, and press-fitting rings 5 are inserted in the annular grooves 4 formed at the object 1 and 2, so that a shearing force is exerted to the press-fitting rings 5.

Although a large number of bolts and nuts can be saved through the above construction, its working has been nearly impossible because it is difficult to insert the remaining part of the press-fitting ring 5 into the annular groove 4 in the second one of the objects 1 and 2 in the course of overlapping the objects 1 and 2 after inserting a part of the press-fitting ring 5 into the annular groove 4 in the first one of the objects 1 and 2. In case the press-fitting ring 5 has an inclined side wall surface 5b of an annular body 5a and inclined corners 5c, inserting of the press-fitting ring 5 and jointing of the objects 1 and 2 become easier. However, a severe tensional load is applied to the bolts 6 due to the partial force by the inclined side wall surface 5b so as to precipitate the break of the bolts 6.

As a result of test under various load conditions after jointing the objects 1 and 2 with having inserted the press-fitting ring 5, we found that the objects 1 and 2 having weak surface strength compared to the press-fitting ring 5 are locally broken or damaged with ease as shown in FIGS. 18 and 20 before the happening of shearing force by change of temperature, static load, vibration, earthquake, dynamic load, etc., and that such local break or damage causes the break of the bolts which disturbs employment of this technic.

Therefore, the inventor of the present invention has invented the present invention through researching instead of applying the above technic.

SUMMARY OF THE INVENTION

The present invention has been made to overcome the above described problems of the prior arts, and accordingly it is an object of the present invention to provide a construction and a method for jointing steel members using shear rings, and more particularly to a construction and method for jointing steel members using shear rings, achieving a jointing construction to which a real shearing force can be applied in jointing the steel base member and the steel overlapping plate by using bolts and shear rings, thereby improving working conditions, reducing material, and improving the jointing strength and durability.

According to the present invention to achieve the above object, provided is a construction for jointing a plurality of steel members using shear rings, said construction comprising:

at least one first steel member and at least one second steel member overlapped together, the first steel member and the second steel member respectively having at least a bolt hole and at least an annular groove, the bolt hole being formed through each of the first steel member and the second steel member, the annular groove being formed at each of contact surfaces of the first steel member and the second steel member, the first steel member and the second steel member being jointed together by at least one bolt inserted through the bolt hole and tightened by a nut, the bolt hole having a first clearance, the annular groove of one of the first steel member and the second steel member having a second clearance smaller than the first clearance, and at least one shear ring inserted in the annular groove of both the first steel member and the second steel member to prevent slip between the first steel member and the second steel member together with the bolt and the nut, wherein the second clearance allows a deformation or a displacement of the first steel member and the second steel member against a tightening force by the bolt and the nut until a predetermined limit, and the second clearance allows a shearing force to be applied to the shear ring by the deformation or the displacement after the predetermined limit, the bolt coming in contact with a side wall of the bolt hole at the predetermined limit, the deformation or the displacement being caused by temperature change, static load, vibration, earthquake, dynamic load, etc., the shear ring having a central side wall surface arranged at a side wall surface of the shear ring, the central side wall surface coming in contact with at least a part of each side wall of the first steel member and the second steel member up and down from the contact surfaces of the first steel member and the second steel member for applying a real shear force to the shear ring when the contact due to the deformation or the displacement happens at the second clearance.

According to another embodiment of the present invention, the construction for jointing a plurality of steel members using shear rings, said construction comprises:

at least one first steel member and at least one second steel member overlapped together, the first steel member and the second steel member respectively having at least a bolt hole and at least an annular groove, the bolt hole being formed through each of the first steel member and the second steel member, the annular groove being formed at each of contact surfaces of the first steel member and the second steel member, the first steel member and the second steel member being jointed together by at least are bolt inserted through the bolt hole and tightened by a nut; and at least one shear ring inserted in the annular grooves of both the first steel member and the second steel member to prevent slip between the first steel member and the second steel member together with the bolt and the nut, wherein insertion-guiding surfaces are formed at both corners of the upper end of the shear ring in section, so that the shear ring can be easily inserted in the annular groove of the first steel member even with nearly no allowance, in case where there is nearly no deformation or displacement of the first steel member and the second steel member by temperature change, vibration, earthquake, dynamic load, etc., except static load. By this construction, the working condition is greatly improved because the shear ring can be more easily inserted in the annular ring of the first steel member. Further, the first and the second steel members can be more firmly jointed together because the shear ring can be inserted in the annular groove of the first steel member nearly without allowance.

The present invention also provides a method for jointing a plurality of steel members using shear rings, said method comprising the steps of:

(1) forming bait holes respectively at plural first steel members and plural second steel members which are overlapped and assembled together;

(2) forming at least one annular groove at each of contact surfaces of the first steel members and the second steel members overlapped together, the annular groove of the second steel members having a size capable of tightly receiving a part of the shear ring, and the annular groove of the first steel member having a size capable of receiving the shear ring with a second clearance;

(3) forcedly inserting and fixing a part of the shear ring in the annular groove of the second steel member, (4) inserting and then maintaining a remaining part of the shear ring in the annular groove of the first steel member by relatively displacing and approaching the first steel member and the second steel member in a state that the first steel member and the second steel member are overlapped, to thereby align the first steel member and the second steel member, (5) inserting each bolt in each bolt hole of the first steel member and the second steel member; and (6) tightening each bolt inserted in each bolt hole of the fast steel member and the second steel member by each nut, so that the shear ring is completely inserted and forced in the annular grooves of the first steel member and the second steel member, to thereby complete jointing of the first steel member and the second steel member by the bolt, the nut and the shear rings.

BRIEF DESCRIPTION OF THE DRAWINGS

The above object, and other features and advantages of the present invention will become more apparent by describing in detail preferred embodiments thereof with reference to the attached drawings, in which.

DESCRIPTION OF THE PREFERRED EMBODIMENTS

Several preferred embodiments of the present invention will be described in detail with reference to the accompanying drawings.

Figure 4:
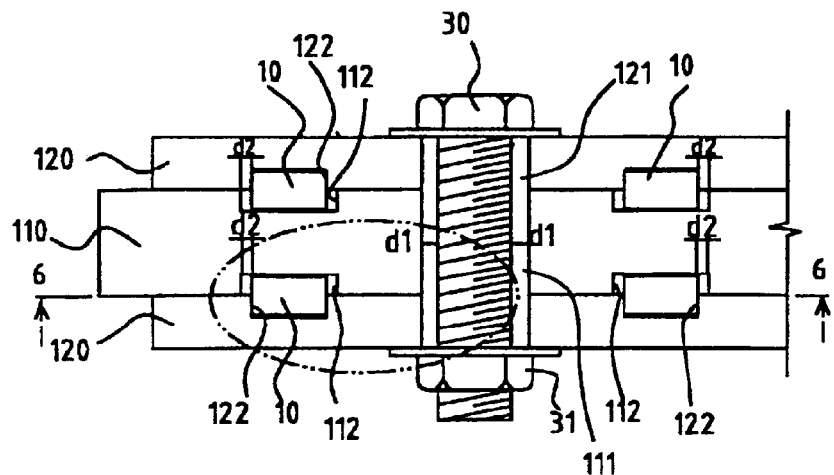
FIG. 4 is a sectional view of a construction for jointing steel members using shear rings according to an embodiment of the present invention.
Figure 5:
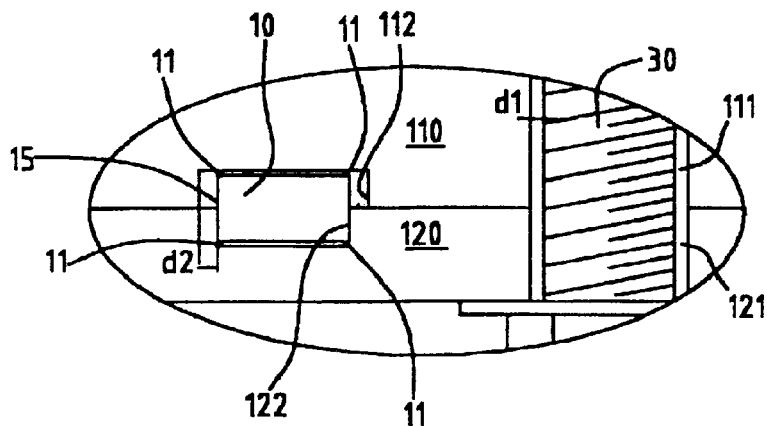
FIG. 5 is an enlarged sectional view of the part near the shear ring of the construction shown in FIG. 4.
Figure 6:
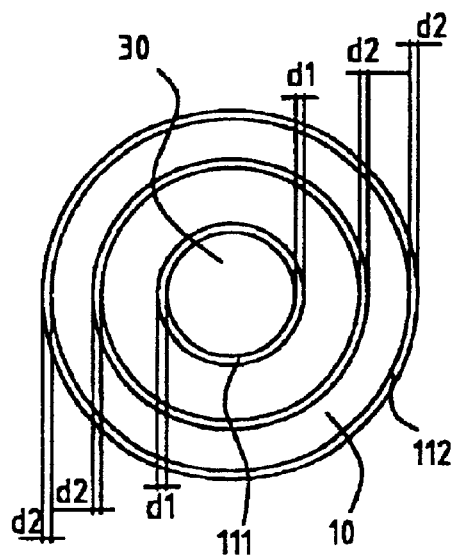
FIG. 6 is a sectional view along line 6—6 in FIG. 4.

FIG. 4 is a sectional view of a construction for jointing steel members using the shear rings according to an embodiment of the present invention, FIG. 5 is an enlarged sectional view of the part near the shear ring of the construction shown in FIG. 4, and FIG. 6 is a sectional view along line 6—6 in FIG. 4.

In a construction for jointing steel base members 110 and steel overlapping plate 120 using shear rings 10 according to an embodiment of the present invention shown in FIGS. 4 to 6, the base members 110 and the overlapping plates 120 respectively having bolt holes 111 and 121 are overlapped and then assembled by screwing bolts 30 screwed through the bolt holes 111 and 121 into nuts 31.

At least one line of annular grooves 112 and 122 is formed at each contact surface of both the base member 110 and the overlapping plate 120, and the shear rings 10 are inserted in the annular grooves 112 and 122 of the base member 110 and the overlapping plate 120, so that they, together with the bolt 30 and the nut 31, can prevent sliding between the base member 110 and the overlapping plate 120.

In this construction, arranged in the annular groove 112 of the base member 110 is a second clearance d2 smaller than a first clearance d1 of the bolt holes 111 and 121, according to the present invention.

The second clearance d2 arranged in the annular groove 112 can serve the following function.

That is, in case where external stress due to temperature change, static load, vibration, earthquake, dynamic load, etc., is applied directly to the shear rings 10, the base member 110 having weak surface strength can be locally broken or damaged to protrude between the contact surfaces, thereby breaking the bolts 6, and especially the contracting or expanding force due to the temperature change, which is generated according to the coefficient ($1.2 \times 10^{-5}$ 1/° C.) of linear expansion of the iron, can make this phenomenon more severe. However, the second clearance d2 arranged in the annular groove 112 of the base member 110 according to the present invention can absorb the deformation or displacement by the contracting or expanding force according to the temperature change, and only the force producing deformation or displacement larger than the second clearance d2 can serve as a shearing force to the shear rings 10.

Figure 18:
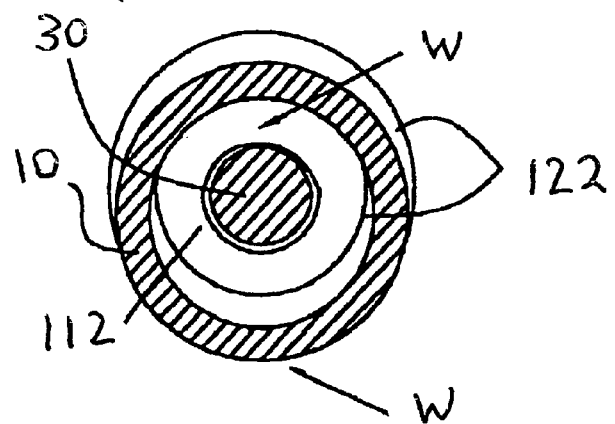
FIG. 18 is a partial plan view of the conventional jointing construction by the forced ring in a state when an excessive load has been exerted.
Figure 19:
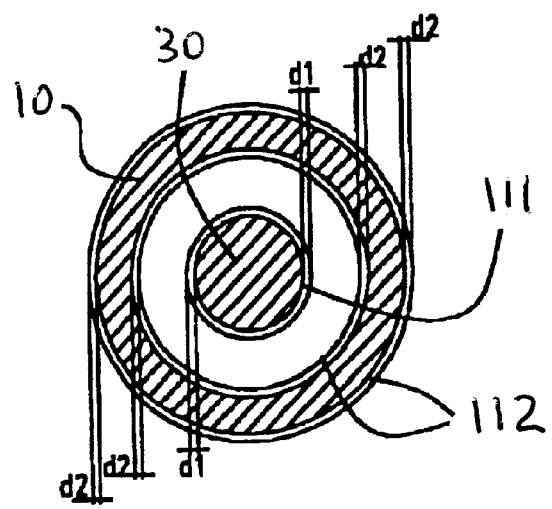
FIG. 19 is a partial plan view of a jointing construction of the present invention by the forced ring in a state when an excessive load has been exerted.

Therefore, such a large shearing force as that in the construction without the second clearance d2 is not applied to the shear rings 10. In result, even though such a deformation force as that in FIG. 18 is applied, in case the second clearance d2 is arranged in the annular grooves 112 as shown in FIG. 19, the bolt holes 111 and 121 of the shear ring 10 and the base member 110 maintain their original shapes, to thereby maintain their safe state differently from the conventional construction. This enables employing the shear ring 10, not the press-fitting ring.

Figure 1:
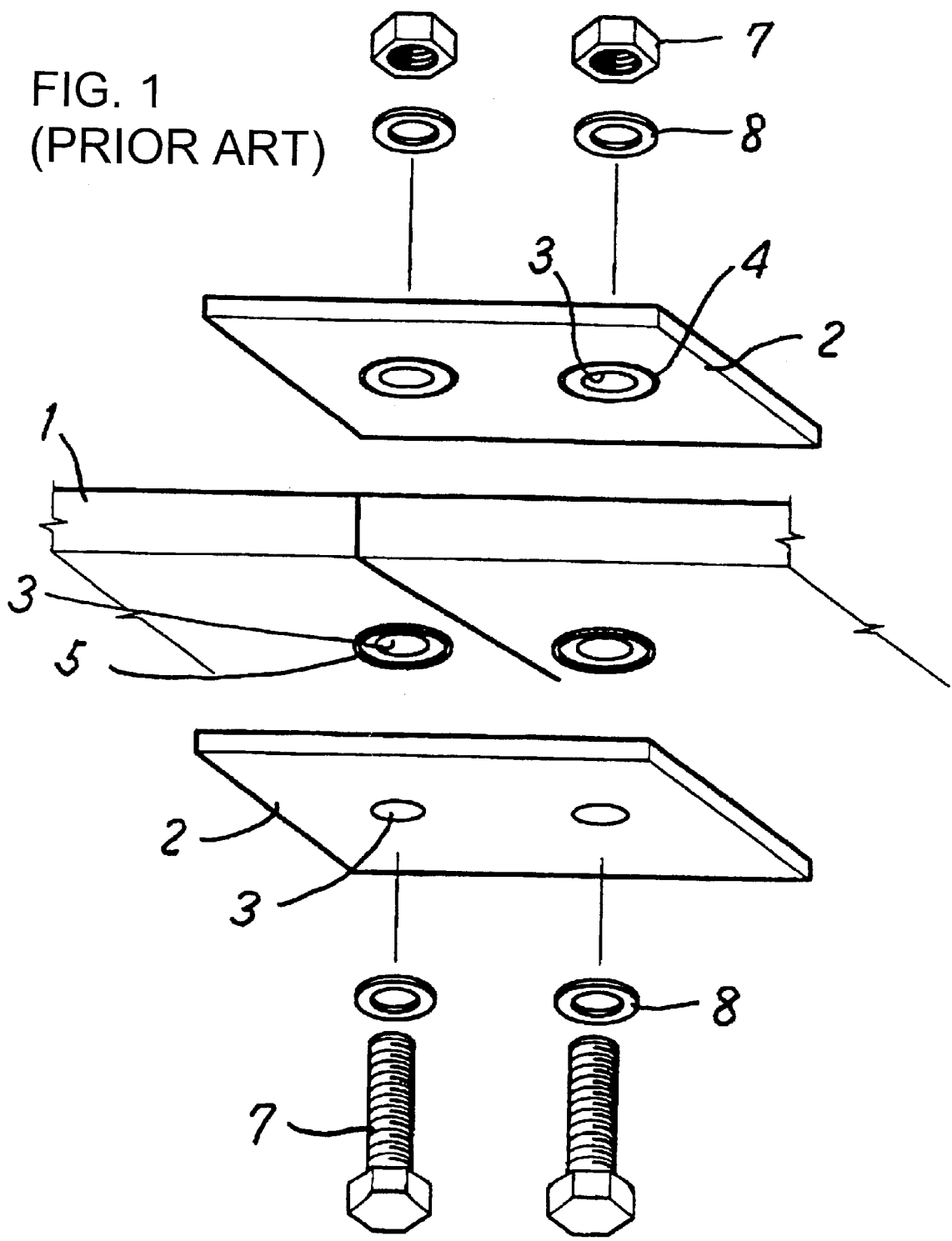
FIG. 1 is a perspective view of the conventional construction for jointing steel members using the forced rings.
Figure 2:
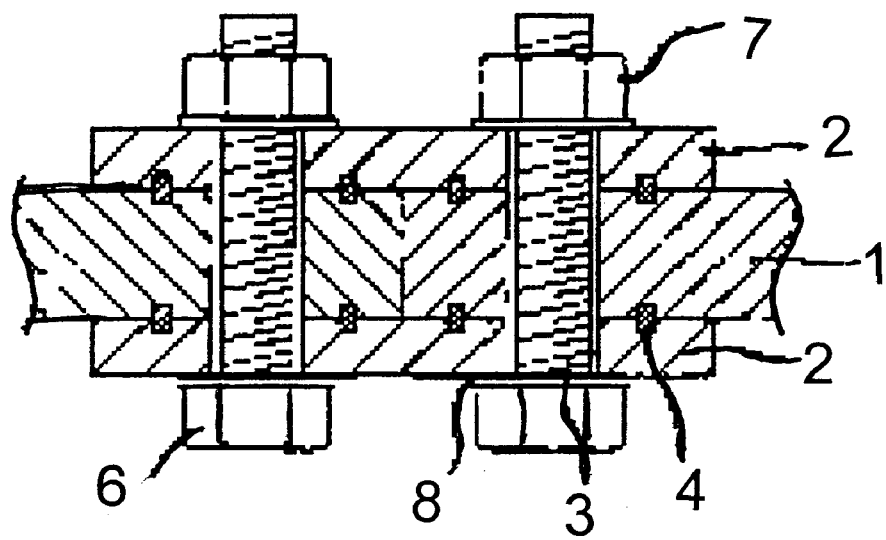
FIG. 2 is a sectional view of the jointing construction shown in FIG. 1.
Figure 3:
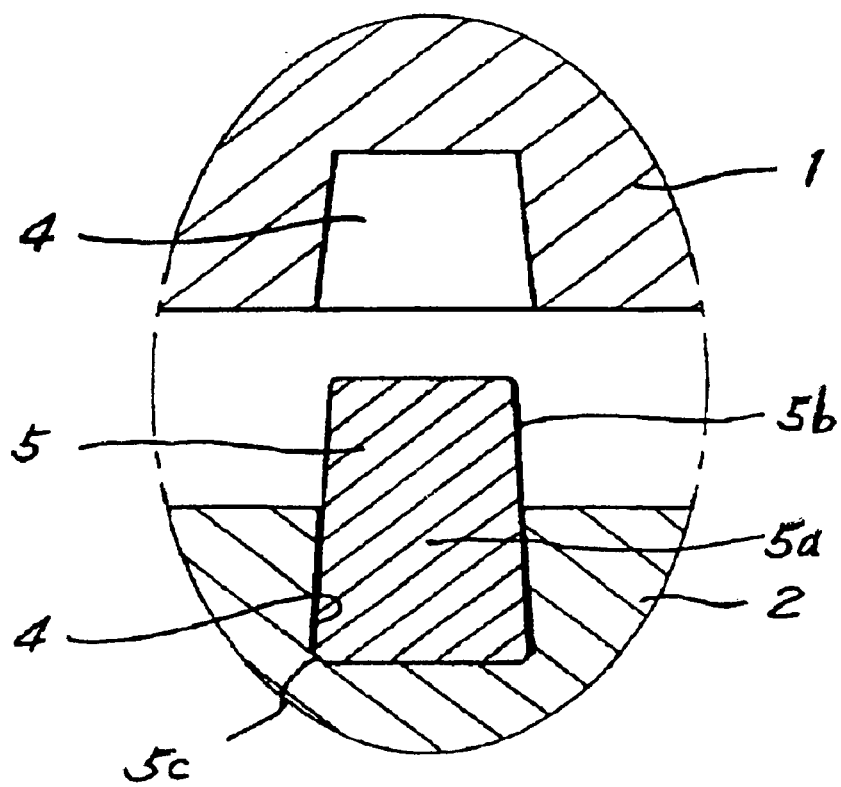
FIG. 3 is a partly enlarged section of the jointing construction shown in FIG. 1 for describing the process of forcedly inserting the forced ring into the second one of the object to be jointed after the forced ring has been inserted in the first one of the object.
Figure 20:
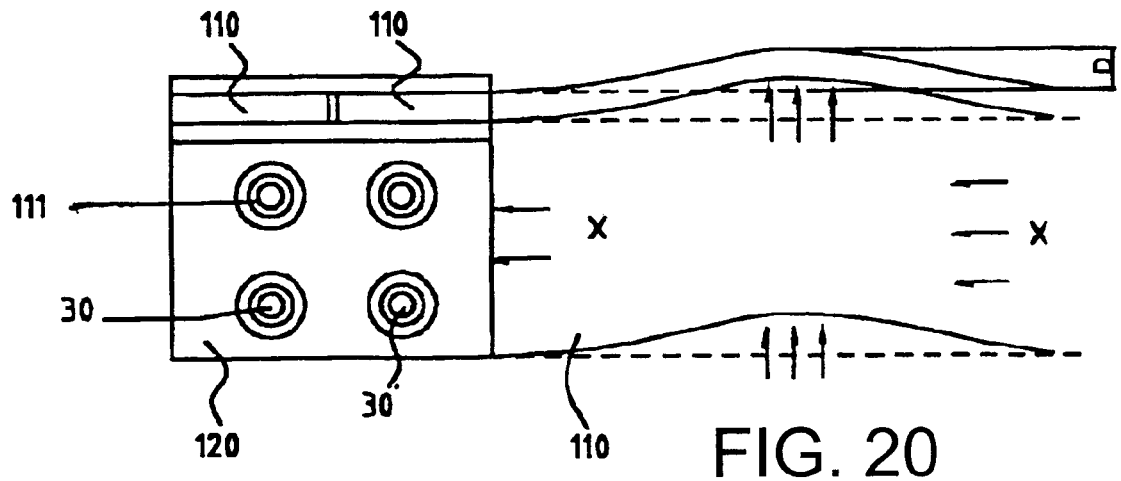
FIG. 20 is a partial front view of the conventional jointing construction in which buckling has happened.
Figure 21:
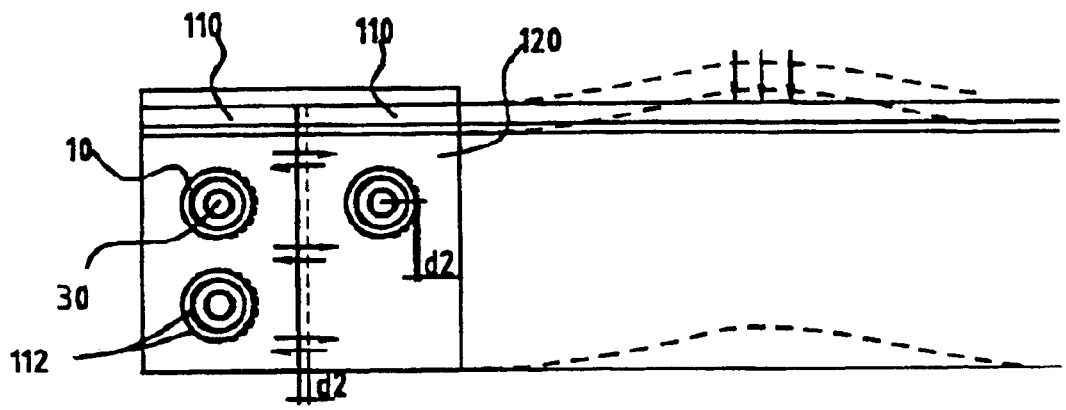
FIG. 21 is a partial front view of a jointing construction of the present invention in which buckling is prevented.

Further, when the buckling happens by the same load, the result as shown in FIGS. 20 and 21 happens because of similar reason, with respect to the constructions of FIGS. 2 and 4.

That is, FIG. 20 shows a phenomenon that the base member 110 experiences buckling D by a length corresponding to the expansion X or the contraction of the base member 110, because the jointing part can not absorb the deformation or displacement of the base member 110 due to its contraction, expansion etc.

However, the jointing construction, according to the present invention reveals an effect of preventing or minimizing the buckling by absorbing the expansion X of the contraction of the base member 110 by the second clearance d2 and restoring to the original state, as shown in FIG. 21.

As described above, according to the present invention, strength against break or buckling can be largely increased by arranging the second clearance d2 between the base member 110 and the shear ring 10 in inserting the shear ring 10, and also a large deformation force can be absorbed by ensuring movability of the jointing portion through adjusting of the second clearance d2.

Moreover, in the present invention, it is more preferable that the second clearance d2 of the annular groove 112 of the base member 110 is set to be smaller than the first clearance d1 of the bolt holes 111 and 121 as shown in FIGS. 4 and 5, so that the lateral load is applied to the shear ring 10, never to bolt 30. In this case, the lateral load is firstly applied against the coupling force of the bolt 30 and the nut 31. However, when the lateral load increases to be larger than the resistance by the coupling force, secondly it is applied to the shear ring 10, and the side wall portions of the bolt holes 111 and 121 increase do not contact with the bolt 30, so that the shearing force is not applied to the bolt 30. Accordingly, since a complex stress is not applied to the bolt 30, the number of the bolts can be largely reduced in comparison with the conventional friction jointing method and since the sectional area of the base member 110 and overlapping plate 120 can be largely increased to thereby reduce their thickness and width, the material to be used can be largely reduced.

Moreover, the increased effective sectional area of the base member 110 and overlapping plate 120 enables the first clearance d1 of the bolt holes 111 and 121 to be increased, and the shear rings 10 achieve sufficient jointing strength to thereby realize employment of thicker steel base member 110 and thicker steel overlapping plate 120. Meanwhile, according to another aspect of the present invention, the shear ring 10 has a central side wall surface 15 being in contact with at least a part of the side wall of the base member 110 in vertical direction from the contact surface of the overlapping plate 120 and the base member 110, so that the shearing force as pure as possible can be applied to the shear ring 10 when the base member 110 or the overlapping plate 120 is deformed or displaced as shown in FIGS. 5 to 8.

Further, in FIGS. 4 to 8, the central circles of the annular grooves 112 and 122 coincide with each other, and the annular groove 122 of the base member 110 has a larger width than that of the annular groove 112 of the overlapping plate 120, so that the second clearance d2 is formed equally at both sides. According the types and conditions of the load, the second clearance d2 may be formed only at one side.

Figure 7A:
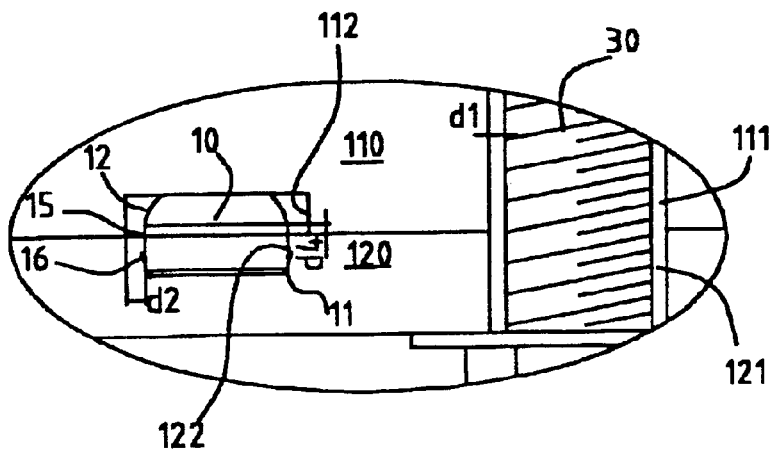
FIGS. 7a and 7b are enlarged sectional views of the part near the shear ring for showing constructions according to other embodiments of the present invention.
Figure 7B:
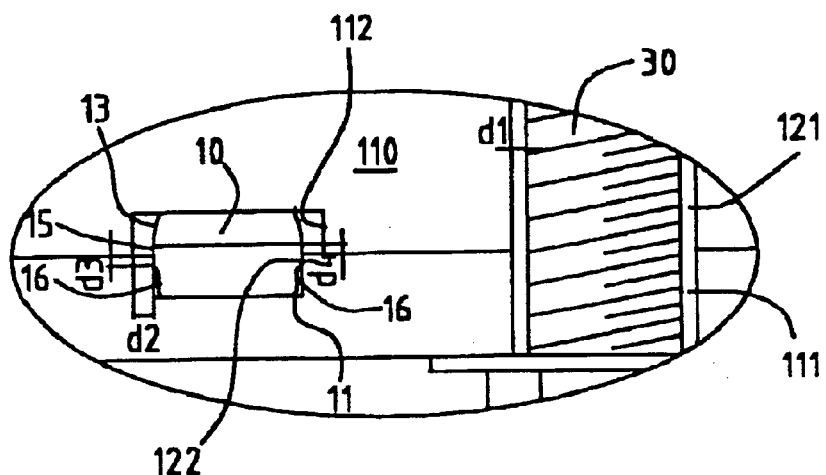
Figure 9:
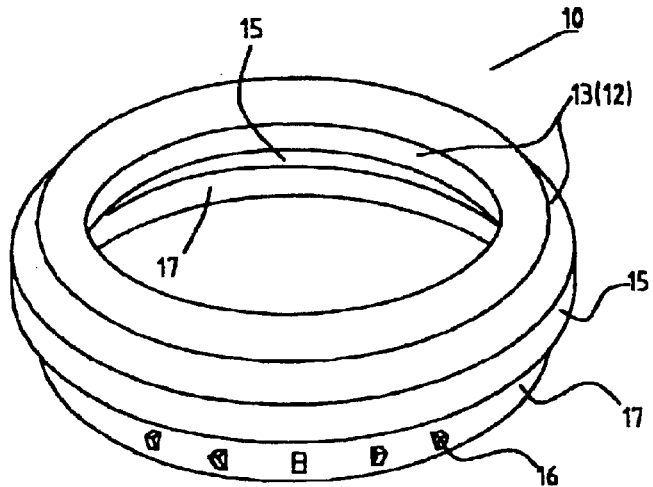
FIG. 9 is a perspective view of a shear ring according to the present invention.

Moreover, in the jointing construction of the present invention, the shear ring 10 may be constructed to be prevented from being separated when it has been partially inserted in the annular groove 122 of the overlapping plate 120, so as to joint the base member 110 and the overlapping plate 120 more easily. In order to prevent such a separation, a part of the shear ring 10 may be forcedly inserted and fixed in the annular groove 122. Holding protuberances 16 formed at the outer surface of the side wall of the shear ring 10 as shown in FIGS. 5 and 9 may further prevent separation of the inserted shear ring. Also, an adhesive may be applied between the shear ring 10 and the annular groove 122 of the overlapping plate 120, so as to prevent the separation and ensure fixing, or the shear ring 10 may be magnetized to be firmly received in the groove by the magnetic force. The above several examples may be employed simultaneously, and especially when the force for preventing separation is sufficient, a relief surface 17 may be preferably formed as shown in FIGS. 7b and 9, so as to reduce the inserting force.

Figure 8:
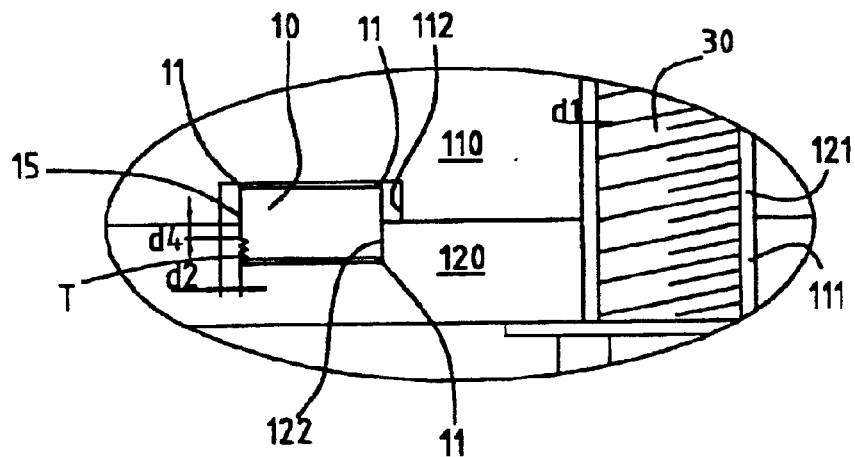
FIG. 8 is an enlarged sectional view of the part near the shear ring for showing a construction according to another embodiment of the present invention.

Further, the annular groove 122 of the overlapping elate 120 and a side surface of the shear ring 10 may be threaded as shown in FIG. 8, so that the shear ring 10 can be not only prevented from being separated by the screw-engagement but also inserted more easily into the annular groove 122 of the overlapping plate 120 through the screwing movement.

Figure 13A:
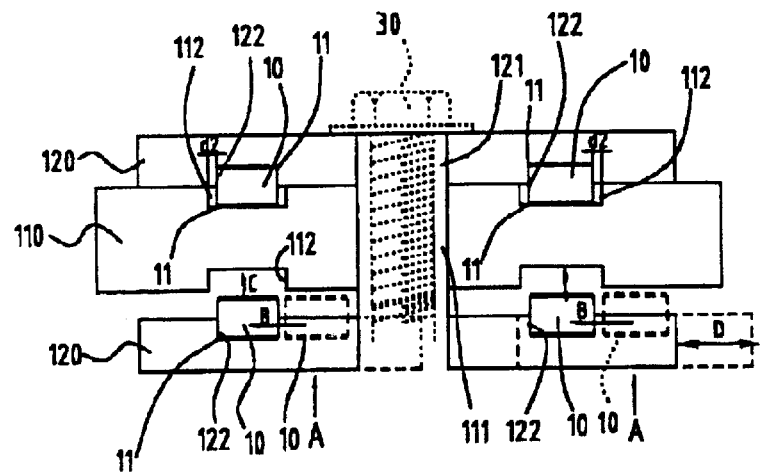
FIGS. 13a and 13b are sectional views for describing the process of jointing the base member and the overlapping plate together according to the present invention.
Figure 13B:
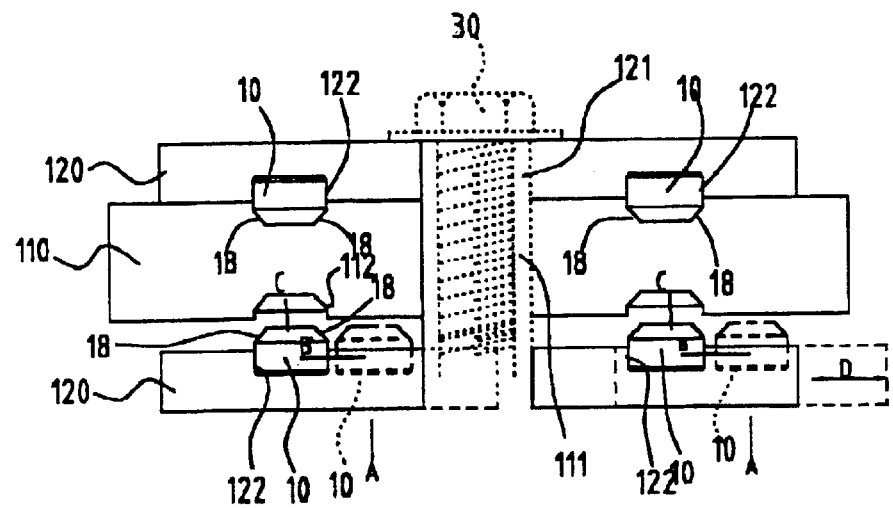

FIGS. 4 to 8 shows various jointing constructions in which a part of the shear ring 10 is fixed in the annular groove 112 of the overlapping plate 120, and then the other part of the shear ring 10 is inserted in the annular groove 112 of increase base member 110 after the overlapping plate 120 is located closer to the base member 110 as shown in FIGS. 13a and 13b. FIG. 5 shows chamfers 11 formed at the upper and lower corners of the shear ring 10, FIG. 7a shows a partial section of an arc surface 12 formed at the upper part of the central side wall surface 15, and FIG. 7b shows an inclined surface 13 formed at the upper part of the central sidewall surface 15. Owing to the arc surface 12, the inclined surface 13 or the chamfer 11, when the base member 110 and the overlapping plate 120 are jointed together as shown in FIG. 13a, the shear ring 10 can be easily caught and received in the annular groove 112 of the base member 110, with a margin of the second clearance d2: This enables employment of the shear ring 10 and largely improves constructing conditions.

A jointing construction according to another embodiment or the present invention has insertion-guiding surfaces 18 formed at both corners of the upper end of the shear ring 10 which is inserted in the annular groove 112 of the base member 110 nearly without allowance as shown in FIG. 13b. This construction may be employed in case where there is nearly no deformation or displacement of the base member 110 and the overlapping plate 120 by temperature change, etc. In this case, the other part of the shear ring 10 is caught in the annular groove 112 of the base member 110, so as to achieve an easy insertion. Also, when the bolt 30 is assembled, insertion of the shear ring 10 is guided by the insertion-guiding surfaces 18, to achieve a further easy insertion. This also largely improves the working condition. Furthermore, more firm jointing can be achieved when the annular groove has a contact surface which comes into contact with the insertion-guiding surfaces 18 when the shear ring 10 has been completely inserted.

Figure 16:
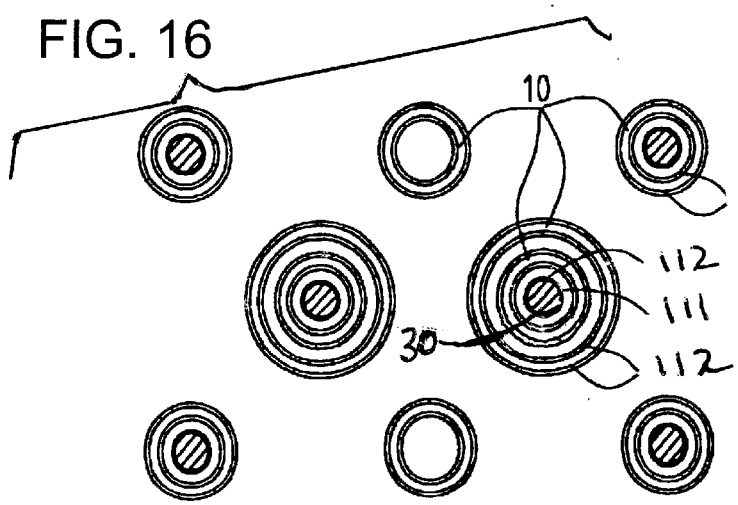
FIG. 16 is a view of an arrangement for showing various jointing construction according to the present invention.
Figure 17:
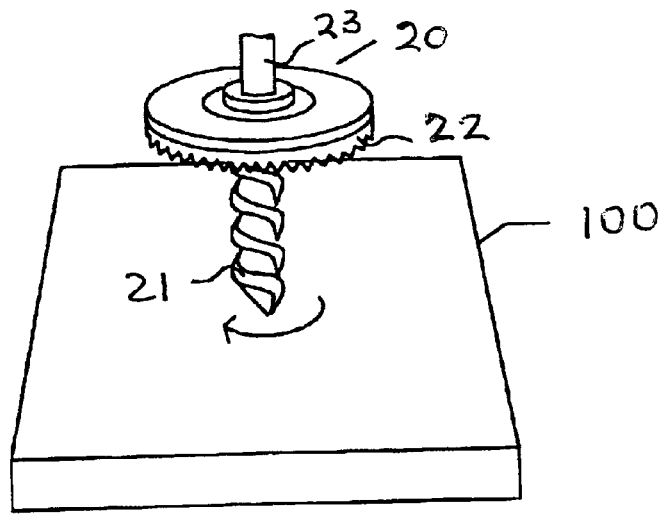
FIG. 17 is a perspective view of a tool for simultaneously forming the bolt holes and the annular grooves.

It is possible that only annular grooves 112 and 122 are formed eccentrically from the bolt holes 111 and 121 and the shear ring 10 is installed in the annular grooves 112 and 122, as shown in FIG. 16. However, FIG. 17 shows a simultaneously-working-tool 20 capable of simultaneously forming the annular grooves 112 and 122 and the bolt 30 when at feast one of the annular grooves 112 and 122 is formed concentrically with the bolt holes 111 and 121 of the base member 110 and the overlapping plate 120. The simultaneously-working-tool 20 has an edge 21 for forming bolt hales and another edge 22 for forming grooves, which are formed integrally and concentric with each other at a rotating shaft 23. The simultaneously-working-tool 20 eliminates the working error to thereby enable more precise working.

Figure 12:
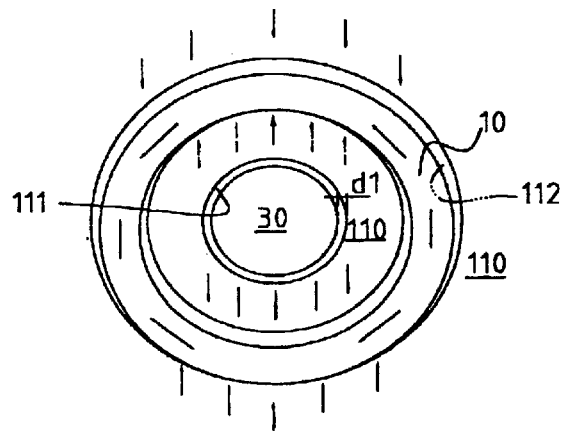
FIG. 12 is a plan view for describing the operation of the present invention

In view of such working, it is preferred that the peripheries of the annular grooves 112 and 122 and the shear rings 10 are circles. That is, when a circular shear ring 10 is employed as shown in FIG. 12 the shearing force is dispersed as shown by arrows at various angles in a plane and accordingly is transferred to nearly entire area of the side wall surfaces of the annular grooves 112 and 122 and nearly entire area of the side wall surface of the shear ring 10. Therefore, the circular shear ring 10 can be said most effective. Of course, the present invention does not exclude an employment of a polygonal shear ring. Further, although shear rings 14 having a closed periphery have been described and drawn in the above embodiments, the present invention includes a shear ring 10 having an open periphery which means a part of the periphery is cut out.

Preferably, the shear ring 10 may be made from material resistant to corrosion or oxidation such as a heat-treated stainless steel named SUS 630, or may be subjected to a rust-resistance treatment after treated by heat in order to prevent oxidation especially in case of a general structural steel. More preferably, the shear ring 10 may be made from material having strength and stiffness not lower than those of the base member 110 and the overlapping plate 120, and can be made from an synthetic resin having the same strength as, or higher strength and stiffness than, that of a steel beam. The shear ring 10 may contain a material responding to non-destructive inspection so that the existence and the location of the shear ring 10 can be sensed by the non-destructive inspection such as a radiation inspection, an X-ray inspection and a magnetic inspection, after construction. Further, an identifier such as a bar-code may be attached to the shear ring 10 to thereby enable identification of its size, kind, etc., together with the inspection.

Figure 14:
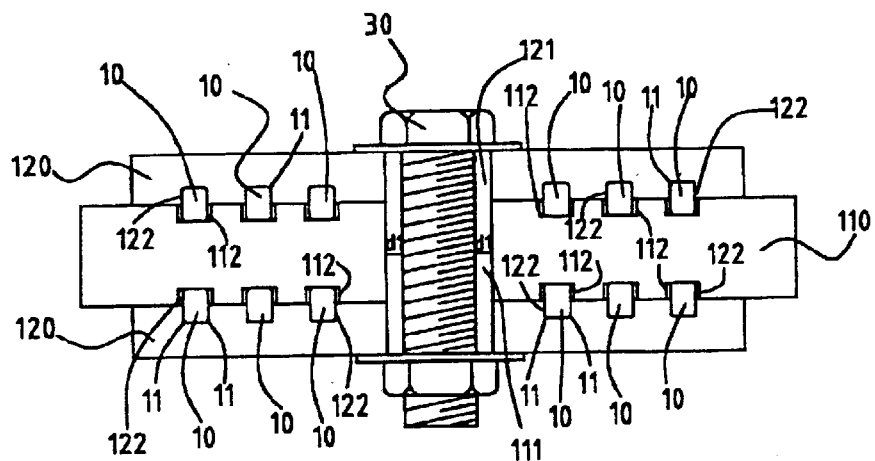
FIG. 14 is a sectional view of another jointing construction according to the present invention.
Figure 15:
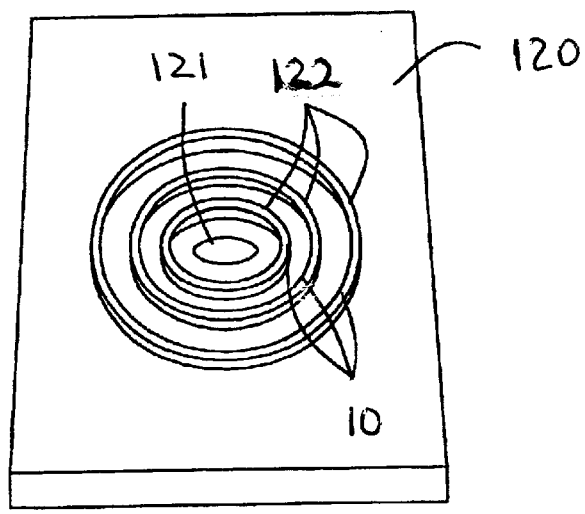
FIG. 15 is a perspective view of the jointing construction of FIG. 14 in which the shear ring has been inserted in the overlapping plate.

FIGS. 14 and 15 show a jointing construction in which the base member 110 and the overlapping plate 120 respectively have three lines of annular grooves 112 and 122 in which three shear rings 10 having diameters different from one another are inserted respectively. Further, in an arrangement in the jointing construction shown in FIG. 16, a shear ring 10 is disposed in one annular groove 112 and 122 concentric with the bolt holes 111 and 121, two shear rings 10 are disposed in two fines of annular grooves 112 and 122 concentric with the bolt holes 111 and 121, and another shear ring is disposed in annular grooves 112 and 122 eccentric with the bolt holes 111 and 121. The present invention includes such an arrangement of the shear rings 10 with a wide variety.

In a method of jointing the steel members in order to embody the present invention having the above construction, one part of the shear rings 10 are firstly inserted in the annular grooves 122 of the overlapping plates 120, and then other part of the shear rims 10 is inserted in the annular grooves 112 of the base member 110 by moving and attaching the overlapping plates 120 near to both sides of the base member 110. Thereafter, the bolt 30 is inserted through the bolt holes 111 and 121 of the base member 110 and the overlapping plate 120 and then tightened by the nut 31. Then, the simultaneous assembling of the shear rings 10 is completed.

In order to achieve the above, at first, bolt holes 111 and 121 are respectively formed at plural base members 110 and plural overlapping plates 120 which are to be overlapped and assembled together (bolt-hole-forming stage), and then at least one line of annular groove 112 and 122 is formed at contact surfaces of the base member 110 and the overlapping plate 120 to be overlapped together (annular-groove-forming stage). In this case, the annular groove 122 of the overlapping plate 120 has a size capable of tightly receiving a part of the shear ring 10, and the annular groove 112 of the base member 110 has a size capable of receiving the shear ring 10 with a second clearance d2. The second clearance d2 can be determined to be smaller than a first clearance d1 by a difference having a range in which, 0<d2<1.5 mm. The second clearance d2 can be changed according to the standard of the material such as the quality of the base member 110 and the overlapping elate 120, the quality and the kinds of the used bolts including bolts for construction and civil engineering, and the size of the bolt holes.

In a design in which the shear ring 10 is inserted in the annular groove 112 of the base member 110 with nearly no allowance as shown in FIG. 13b, the annular groove 112 of the base member 110 is formed without the second clearance d2. Further, in a design in which the annular grooves 112 and 122 are concentric with the bolt holes 111 and 121 of the base member 110 and the overlapping plate 120, the bolt-hole-forming stage and the annular-groove-forming stage can be simultaneously performed by the simultaneously-working-tool 20 as shown in FIG. 17. Also, a plurality of bolt holes 111 and 121 or a plurality of annular grooves 112 and 122 may be formed simultaneously by a multi-spindle drilling machine.

Figure 10:
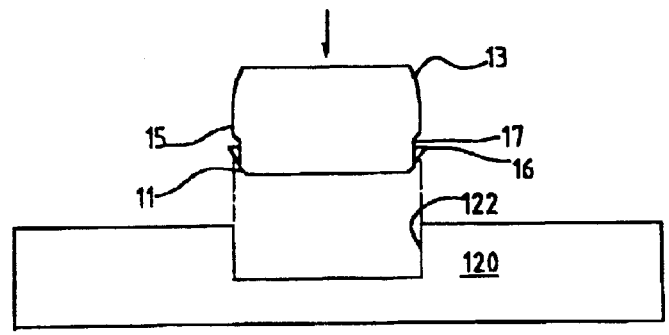
FIG. 10 is a partly enlarged sectional view for describing the process of inserting and fixing the shear ring according to the present invention.
Figure 11:
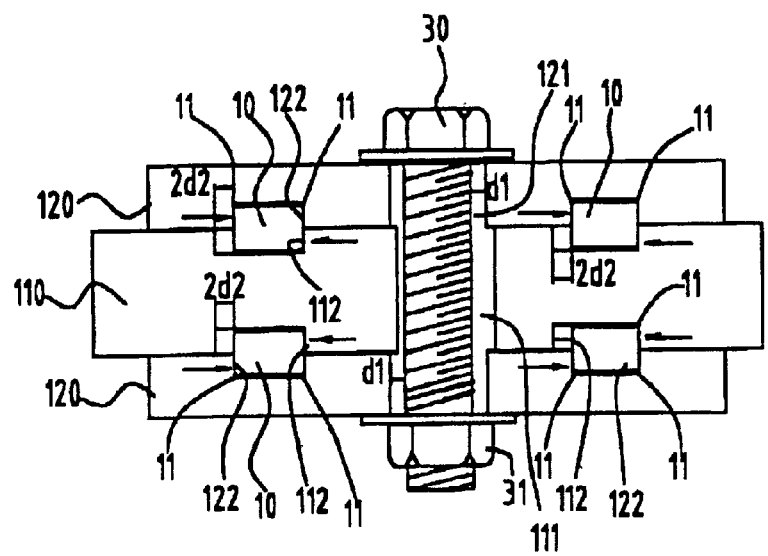
FIG. 11 is a sectional view for describing the operation of the present invention.

Thereafter, a part of the shear ring 10 is forcedly inserted and fixed in the annular groove 122 of the overlapping plate 120 as shown in FIG. 10 (a part-of-shear ring-fixing stage). The shear ring 10 is rotated to be fixed instead of being forcedly inserted when it is threaded as shown in FIG. 8. The overlapping plate increase 120 to which the shear ring 10 is fixed as above is moved near to the jointing surface of the base member 110 and is displaced with respect to the base member 110. When the shear ring 10 is caught in the annular groove 112 of the base member 110 having the second clearance d2, the other part of the shear ring 10 is inserted into the annular groove 112 (the-other-part-of-shear ring-inserting stage). Then, the bolt 30 is inserted in the bolt holes 111 and 121 of the overlapping plate 120 and the base member 110 (bolt-inserting stage).

The above a-part-of-shear ring-fixing stage can be performed easily when an arc surface 12, an inclined surface 13 or a chamfer 11 is formed near both ends excepting the central sidewall surface 15 of the shear ring 10 as shown in FIGS. 5 to 7b, and the above the-other-part-of-shear ring-inserting stage and bolt-inserting stage can be performed more easily when the insertion-guiding surfaces 18 are formed.

Thereafter, the bolt 30 inserted in the bolt holes 111 and 121 is tightened by the nut 31 (bolt-tightening stage), so that the shear ring 10 is completely inserted and forced in the annular grooves 112 and 122 of the base member 110 and the overlapping plate 120. Then, the jointing of the base member 110 and the overlapping plate 120 by the bolt 30, the nut 31 and the shear rings 10 is completed.

The above the-other-part-of-shear ring-inserting stage and bolt-inserting stage may further include a bolt-hole-aligning stage, in which the bolt holes 111 and 121 of the base member 110 and the overlapping plate 120 are precisely aligned by laterally displacing one of the base member 110 and the overlapping plate 120 until the second clearances d2 at an inner wall and at an outer wall of the shear ring 10 become equal to each other. Preferably, the bolt-hole-aligning stage may be performed in a state that the nut has been so tightened that there is no slip between the overlapping plate 120 and the base member 110 due to their weight, and then the nut may be completely tightened.

On the other hand, according to the present invention, the second clearance d2 may formed in the annular groove 122 of the overlapping plate 120, in which case the shear ring 10 is firstly fixed in the annular groove 112 of the base member 110. Even in a state that the shear ring 10 is fixed in the base member 110, the position of the, overlapping member 120 can be easily set to highly improve the working condition, since the overlapping plate 120 and the base member 110 including the shear ring 10 may be jointed together according to the jointing method of the present invention as described above.

The following result has been obtained by experimenting with the shear ring 10.

First, in case the shear ring 10 is installed, at a concentric circle with respect to a high-tensile bolt of M20, the employed sizes have been as follows: the outer and the inner diameters of the shear ring 10 are respectively 60 mm and 40 mm; the annular groove 122 of the overlapping plate 120 has the same outer and inner diameters; the outer and the inner diameters of the annular groove 112 of the base member 110 are respectively 60.5 mm and 39.5 mm; and the second clearance 0.5 mm. Further, a size of at least 0.5 mm has been employed for the first clearance d1 of the bolt holes 111 and 121.

The compression test on this condition has shown the following result in comparison with the conventional friction jointing method. That is, an initial slip has happened at a load of about 38.5 tons in the jointing construction of the present invention, while an initial slip has happened at load of about 7.5 tons in the conventional jointing construction, which means the construction of the present invention is stronger by about five times than the conventional construction Further, the jointing construction of the .present invention has a mean frictional coefficient of 4.28, while the conventional friction jointing construction has a mean frictional coefficient of 0.8, which means the construction of the present invention has a frictional coefficient larger by about six and a half times than that of the conventional construction. Moreover, in a yielding test, the jointing construction of the present invention has shown a resistance to the shearing force larger more than six times in comparison with the conventional construction.

In an aspect of material reduction, while the conventional construction requires thirty two high-tensile bolts 30 to have an anticipated frictional force of 240 tons, the jointing construction of the present invention requires only eight high-tensile bolts 30 and eight shear rings 10 to have an anticipated shearing resistance of 308 tons. Therefore, in comparison with the conventional construction, the jointing construction of the present invention reveals an increase of shearing resistance by 68 tons in total and an increased average of jointing force by 6.3 times by every bolt, which enables reduction of the number of the assembled bolts to $\frac{1}{6.3}$ of its maximum value. Accordingly, material for the base member 110 and the overlapping plate 120 can be largely reduced, when the effective sectional area is maintained the same.

Further, the shear ring 10 can minimize danger factors in an aspect of maintaining the safety in relation to the release of the bolts 30 by the earthquake, vibration, etc.

In a buckling deformation of a steel beam according to expansion caused by a large temperature or load, under the same condition, while the conventional friction jointing method reveals the buckling deformation D as shown in FIG. 20, the second clearance d2 absorbs the expansion to thereby prevent the buckling and maintain the original shape in the jointing construction of the present invention. This explains that the jointing construction of the present invention has an accommodation capability of absorbing the buckling force.

By the construction and method for jointing steel members using shear rings according to several embodiments of the present invention as described above, deformation such as contraction, expansion and buckling of the steel beam according to load, earthquake, large temperature change, etc., can be prevented by providing the shear ring 10, and the jointing construction can be maintained in a highly stable state. Further, the jointing position of the base member 110 and the overlapping plate 120 can be easily adjusted, and the adjusted steel members can be maintained at their position in a stable manner.

Moreover, the second clearance d2 makes the jointing work easier in great degree, and the increase of jointing force, the reduction of the number and assembling work of the bolts, and the increase of the effective sectional area cause the increase of the strength of the construction or the reduction of the material, thereby reducing time, expense and material for the jointing work. Besides, duration requiring use of high-priced heavy constructional machines can be reduced, and instead simple, easy, safe and precise work is possible in a short period. In addition, achieved are the following advantages: a strong pointing force; an improved durability; easy maintenance; and so on.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. A method for jointing a plurality of steel members using shear rings, said method comprising the steps of
   (1) forming bolt holes respectively at plural first steel members and plural second steel members which are overlapped and assembled together;
   (2) forming at least one annular groove at each of contact surfaces of the first steel members and the second steel members overlapped together, the annular groove of the second steel members having a size capable of tightly receiving a part of the shear ring, and the annular groove of the first steel member having a size capable of receiving the shear ring with a second clearance;
   (3) forcedly inserting and fixing a part of the shear ring in the annular groove of the second steel member;
   (4) inserting and then maintaining a remaining part of the shear ring in the annular groove of the first steel member by relatively displacing and approaching the first steel member and the second steel member in a state that the first steel member and the second steel member are overlapped, to thereby align the first steel member and the second steel member;
   (5) inserting each bolt in each bolt hole of the first steel member and the second steel member; and
   (6) tightening each bolt inserted in each bolt hole of the first steel member and the second steel member by each nut, so that the shear ring is completely inserted and forced in the annular grooves of the first steel member and the second steel member, to thereby complete jointing of the first steel member and the second steel member by the bolt, the nut and the shear rings.

2. A method as claimed in claim 1, wherein, before completely tightening each nut, said method further comprises a step of precisely aligning the bolt holes of the first steel member and the second steel member by laterally displacing one of the first steel member and the second steel member so that the second clearance becomes equal to each other at an inner wall and at an outer wall of the shear ring when the annular grooves of the first steel member and the second steel member have a same center line;

wherein, at least one of an arc surface, an inclined surface and a chamfer is formed near both ends excepting a central side wall surface of the shear ring, so that the remaining part of the shear ring can be caught by and forcedly inserted into the annular groove of the first steel member with ease in the steps of 3, 4 and 6;

wherein the shear ring is guided to be inserted in the annular groove of the first steel member nearly without allowance by insertion-guiding surfaces formed at both corners of an upper end of the shear ring in the steps of 4 and 6, the annular groove of the first steel member having no second allowance, where there is nearly no deformation or displacement of the first steel member and the second steel member, excluding deformation by static load;

wherein the annular groove is circular and formed concentric with the bolt hole, the bolt hole and the concentric annular groove being formed by a simultaneously-working-tool having an edge for forming bolt holes and another edge for forming grooves concentric with each other; and wherein the shear ring allows an increase in an effective sectional area by reducing number of assembled bolts due to its shearing strength, to thereby increase the first clearance of the bolt hole and thickness of the first steel member and the second steel member.

3. A construction for jointing a plurality of steel members using shear rings, said construction comprising:

at least one first steel member and at least one second steel member overlapped together, the first steel member and the second steel member respectively having at least a bolt hole and at least an annular groove, the bolt hole being formed through each of the first steel member and the second steel member, the annular groove being formed at each of contact surfaces of the first steel member and the second steel member, the first steel member and the second steel member being jointed together by at least one bolt inserted through the bolt hole and tightened by a nut, the bolt hole having a first clearance, the annular groove of one of the first steel member and the second steel member having a second clearance smaller than the first clearance, and at least one shear ring inserted in the annular groove of bath the first steel member and the second steel member to prevent slip between the first steel member and the second steel member together with the bolt and the nut;

wherein the second clearance allows a deformation or a displacement of the first steel member and the second steel member against a tightening force by the bolt and the nut until a predetermined limit, and the second clearance allows a shearing force to be applied to the shear ring by the deformation or the displacement after the predetermined limit, the bolt coming in contact with a side wall of the bolt hole at the predetermined limit, the shear ring having a central side wall surface arranged at a side wall surface of the shear ring, the central side wall surface coming in contact with at least a part of each side wall of the first steel member and the second steel member up and down from the contact surfaces of the first steel member and the second steel member for applying a real shear force to the shear ring when the contact due to the deformation or the displacement happens at the second clearance.

4. A construction as claimed in claim 3, wherein the second clearance is arranged by forming the annular groove of the first steel member wider than the annular groove of the second steel member where the first steel member is a base member which is overlapped by the second steel member, and one of the following treatments is executed to prevent separation of the shear ring during overlapping and assembling: forcedly inserting a part of the shear ring into the annular groove of the second steel member; forming a separation-preventing protuberance at an outer wall surface of the shear ring; adhering the shear ring into the annular groove of the second steel member by adhesive; magnetizing the shear ring; and threading at one side wall surface of the shear ring and the annular groove of the second steel member.

5. A construction as claimed in claim 3, wherein at least one of an arc surface, an inclined surface and a chamfer is formed at the shear ring from the central side wall surface, so that a remaining part of the shear ring can be caught by and forcedly inserted into the annular groove of the first steel member with ease when the first steel member and the second steel member are relatively displaced and approached in a state that the first steel member and the second steel member are overlapped.

6. A construction as claimed in claim 3, wherein the annular groove of the first steel member and the second steel member is formed concentric with the bolt hole, the bolt hole and the concentric annular groove being formed by a simultaneously-working-tool having an edge for forming bolt holes and another edge for forming the annular groove concentric with each other, the annular groove and the shear ring respectively having a periphery shaped as one of a polygon and a circle, the periphery of the shear ring being one of an open type and a closed type, the shear ring due to its shearing strength increasing an effective sectional area by reducing number of assembled bolts in comparison with a conventional friction jointing method, to thereby allow an increase in the first clearance of the bolt hole and thickness of the first steel member and the second steel member, and the shear ring being subject to a corrosion-resisting treatment and formed to contain a material responding to non-destructive inspection.

* * * * *